O. M. FANCHER.
BRAKE FOR LINOTYPE MACHINES.
APPLICATION FILED FEB. 21, 1913.
1,088,557.
Patented Feb. 24, 1914.
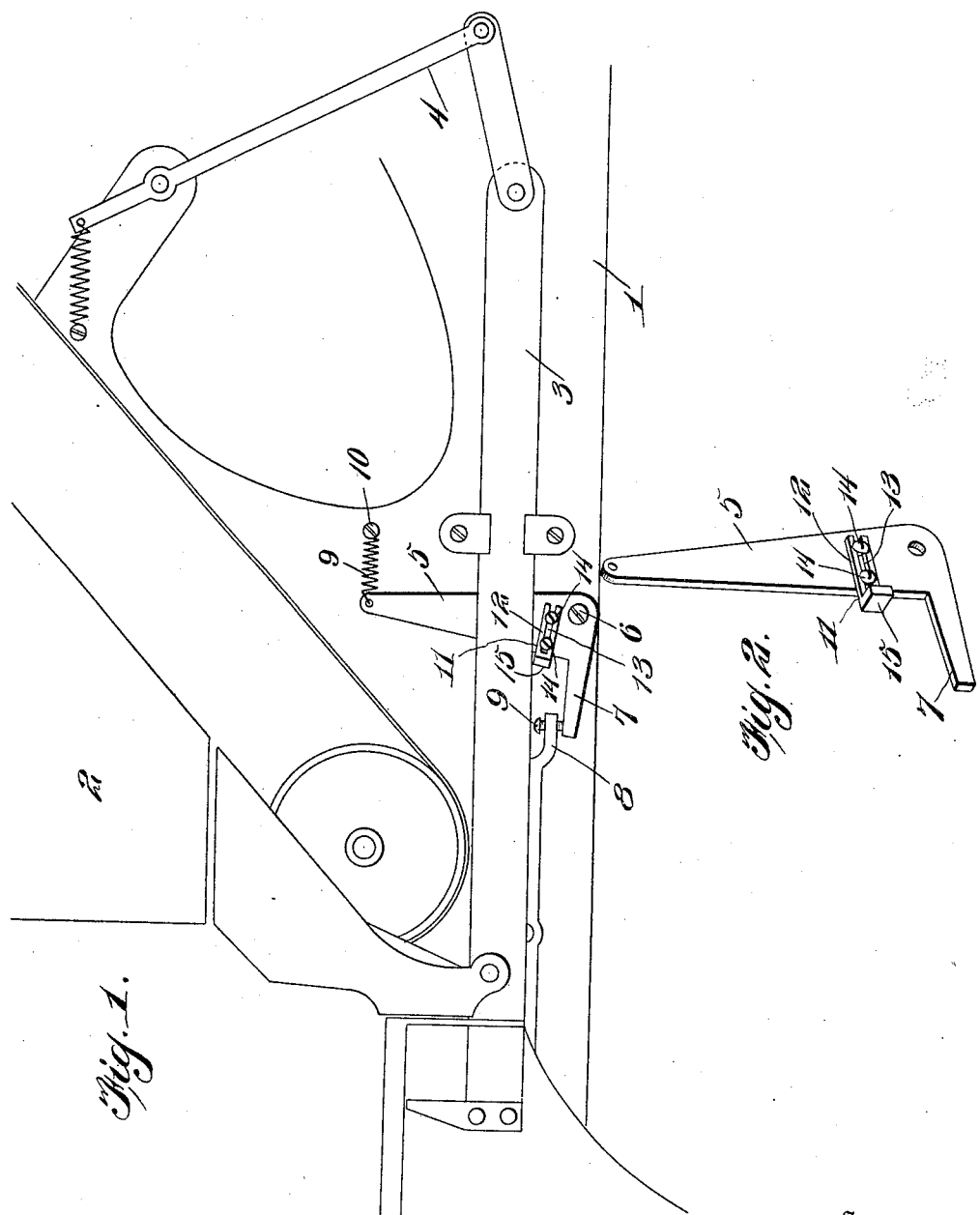
Witnesses
Louis R. Heinrichs
D. W. Gould
Inventor
Otto M. Fancher
By Victor J. Evans
Attorney

UNITED STATES PATENT OFFICE.

OTTO M. FANCHER, OF SACRAMENTO, CALIFORNIA.

BRAKE FOR LINOTYPE-MACHINES.

1,088,557.      Specification of Letters Patent.      Patented Feb. 24, 1914.

Application filed February 21, 1913. Serial No. 749,991.

*To all whom it may concern:*

Be it known that I, OTTO M. FANCHER, a citizen of the United States, residing at Sacramento, in the county of Sacramento and State of California, have invented new and useful Improvements in Brakes for Linotype-Machines, of which the following is a specification.

The invention relates generally to an improvement in linotype machines and particularly to a brake for restraining the forward movement of the assembler slide while the line of matrices is being assembled in the stick.

The object of the present invention is the provision of a brake including a contact member which is adjustably mounted with relation to its support whereby various adjustments may be readily had without in any way disturbing the remaining parts of the structure.

The invention in its preferred form of details will be described in the following specification, reference being had particularly to the accompanying drawings, in which:—

Figure 1 is a fragmentary front elevation of the assembling mechanism of linotype machine showing the improved brake in position. Fig. 2 is a detached perspective view of the brake.

Referring particularly to the accompanying drawings, 1 represents a frame of the linotype machine designed for supporting the assembling mechanism, 2 a casing for the customary matrice chutes, 3 the assembler slide and 4 the reciprocating mechanism therefor.

The improved brake which is designed to coöperate with the slide comprises an angle plate 5 pivotally supported upon a stud 6 projecting from the frame 1 beneath the assembler, the short arm 7 of the plate being designed to be engaged by an actuating member 8 carried by the frame and having an adjusting screw 9 for engaging and operating the plate to release the brake. The plate 5 is normally held in braking relation to the slide through the medium of its coil spring 9 secured to the free terminal of the long arm of the plate and to the stud 10 on the frame.

Secured to the angle plate above the pivot and beneath the slide is a brake member 11. This member comprises a bar like section 12 formed with a centrally arranged longitudinal slot 13 opening through one end of the member, said slot forming a means whereby the braking member may coöperate with the pins 14 threaded into the plate 5 for securing the braking member and plate together, the construction providing obviously for the adjustment of the braking member with relation to the plate. The pins 14 are so arranged that the braking member normally inclines upwardly toward the slide, so that in the adjustment of said member it is caused to approach or recede from the slide to vary the braking effect. The forward or outer end of the bar 12, or that end immediately adjacent the slide is formed with the lateral head 15 of solid construction, and approximately rectangular shape. The angular disposition of the braking member with respect to the plate 5 is such that one edge of the head engages the slide thereby providing what may be termed a sharp engagement and insuring more effective braking action. It will be obvious that when the engaging edge of the slide becomes worn and its effectiveness as a braking element interfered with it may be readily removed and a new braking member applied, or the worn edge of the old member brought to a condition to present a sharpened edge with the adjacent surface for further use. The adjustment of the braking member, and its method of application whereby it may be readily removed when desired constitute the gist of the present improvement.

What is claimed is:—

A brake for assembler slides of linotype machines including an angle plate pivotally connected to the machine frame below the assembler slide, one arm of said plate being adapted for engagement by an actuator, the other arm of said plate having a spring connection with the machine frame above the slide, and a brake element including a bar like section formed with a longitudinal slot opening through one end thereof and a lateral head forming a braking member and carried by one end of the section, and spaced means for removably and adjustably securing said element to the spring connected arm of the plate at an angle to the proximate edge of the slide, said means passing through the slot in the bar section.

In testimony whereof I affix my signature in presence of two witnesses.

OTTO M. FANCHER.

Witnesses:
 JUSTUS E. STAIGER,
 ROBT. C. DAVIS.

Copies of this patent may be obtained for five cents each, by addressing the "Commissioner of Patents, Washington, D. C."